United States Patent
Hu et al.

(10) Patent No.: US 9,634,709 B2
(45) Date of Patent: Apr. 25, 2017

(54) REMOVABLE ELECTRONIC DEVICE CASE WITH SUPPLEMENTAL ANTENNA ELEMENT

(71) Applicant: Apple Inc., Cupertino, CA (US)

(72) Inventors: Hongfei Hu, Santa Clara, CA (US); Enrique Ayala Vazquez, Watsonville, CA (US); Hao Xu, Cupertino, CA (US); Mattia Pascolini, San Francisco, CA (US); Ruben Caballero, San Jose, CA (US); Erdinc Irci, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/477,596

(22) Filed: Sep. 4, 2014

(65) Prior Publication Data

US 2016/0072539 A1    Mar. 10, 2016

(51) Int. Cl.
*H04M 1/00* (2006.01)
*H04B 1/3888* (2015.01)
(Continued)

(52) U.S. Cl.
CPC ........... *H04B 1/3888* (2013.01); *H01Q 1/243* (2013.01); *H01Q 9/42* (2013.01); *H04M 1/72527* (2013.01)

(58) Field of Classification Search
CPC ..................................................... H01Q 1/243
See application file for complete search history.

(56) References Cited

U.S. PATENT DOCUMENTS 6,341,217 B1    1/2002  Wong
6,456,247 B1    9/2002  Hulick et al.
(Continued)

FOREIGN PATENT DOCUMENTS

EP    2528165    11/2012
WO    9801919    1/1998
(Continued)

OTHER PUBLICATIONS uNu Unity Battery Case for Samsung galaxy S4 SIV. uNu, 2012 [retrieved on Oct. 3, 2014]. Retrieved from the Internet: <http://www.myunu.com/unu-dx-protective-battery-case-for-samsung-galaxy-siv.html>.

(Continued)

*Primary Examiner* — Hsin-Chun Liao
(74) *Attorney, Agent, or Firm* — Treyz Law Group, P.C.; G. Victor Treyz; Michael H. Lyons (57) ABSTRACT

A removable case may receive an electronic device. A male connector in the case may mate with a female connector in the device. A battery in the case may supply power to the device through the male connector. The electronic device may have an antenna formed from peripheral conductive housing structures and an antenna ground. The case may have a supplemental antenna that restores antenna performance when the device is received within the case. The supplemental antenna may be formed from a monopole antenna resonating element coupled to the antenna ground through the power pin. The monopole element may have a portion that runs parallel to the peripheral conductive housing structures. During operation of the antenna in the electronic device, the supplemental antenna in the case may be indirectly fed by near-field coupling between the supplemental antenna and the antenna of the electronic device.

19 Claims, 6 Drawing Sheets

(51) Int. Cl.
*H01Q 1/24* (2006.01)
*H01Q 9/42* (2006.01)
*H04M 1/725* (2006.01)

(56) References Cited

U.S. PATENT DOCUMENTS

| | | |
|---|---|---|
| 6,615,026 B1 | 9/2003 | Wong |
| 7,391,380 B2 | 6/2008 | Nevermann |
| 7,750,855 B2 | 7/2010 | Wong |
| 8,155,607 B2 | 4/2012 | Kim |
| 8,207,906 B2 | 6/2012 | Tiscareno et al. |
| 8,219,003 B2 | 7/2012 | Kudo et al. |
| 8,750,948 B2 | 6/2014 | Wong et al. |
| 9,007,758 B2 | 4/2015 | Wilson et al. |
| 9,124,679 B2 | 9/2015 | Ash, Jr. et al. |
| 2003/0153281 A1 | 8/2003 | Abbasi et al. |
| 2008/0165066 A1 | 7/2008 | Tiscareno et al. |
| 2009/0264148 A1* | 10/2009 | Tom .................. H04M 1/72525 455/550.1 |
| 2010/0013720 A1 | 1/2010 | Sakata et al. |
| 2010/0026589 A1 | 2/2010 | Dou et al. |
| 2011/0248895 A1 | 10/2011 | Bungo et al. |
| 2012/0169439 A1 | 7/2012 | Ikehata et al. |
| 2012/0188141 A1 | 7/2012 | Islam |
| 2012/0295666 A1 | 11/2012 | Sakurai et al. |
| 2013/0059528 A1 | 3/2013 | Hirai |
| 2013/0069583 A1 | 3/2013 | Lemelman et al. |
| 2013/0194136 A1 | 8/2013 | Handro et al. |
| 2013/0194143 A1 | 8/2013 | Bungo |
| 2014/0062816 A1 | 3/2014 | Jo |
| 2014/0065948 A1 | 3/2014 | Huang |
| 2014/0165379 A1 | 6/2014 | Diebel et al. |
| 2014/0333554 A1 | 11/2014 | Kim et al. |
| 2015/0011273 A1 | 1/2015 | Wilmhoff et al. |
| 2015/0055292 A1 | 2/2015 | Lee et al. |
| 2015/0103018 A1 | 4/2015 | Kamin-Lyndgaard et al. |
| 2015/0295446 A1 | 10/2015 | Fathollahi |
| 2016/0149290 A1 | 5/2016 | Park et al. |
| 2016/0191101 A1 | 6/2016 | Rayner |

FOREIGN PATENT DOCUMENTS

| | | |
|---|---|---|
| WO | 2004095634 | 11/2004 |
| WO | 2014011943 | 1/2014 |

OTHER PUBLICATIONS

"Our Technology—Antenna79", Antenna79, [Retrieved on Jan. 29, 2015], Retrieved from the Internet<URL:http://antenna79.wpengine.com/ourtechnology/>.

"iPhone 6 Cases with Advanced Technology from Reach79" Reach79, 2015, [Retrieved on Jan. 29, 2015], Retrieved from the Internet<URL:http://www.reach79.com/>.

"Home", Antenna79, 2015, [Retrieved on Jan. 29, 2015], Retrieved from the internet<URL:http://antenna79/our-technology>.

"Fong Radiation Protection Cases for iPhone, iPad and Samsung Galaxy", Pong, 2014, [ Retrieved on Jan. 29, 2015], Retrieved from the Internet: <URL:http://pongcase.com/>.

Mossberg, "Review: An iPhone Case That Claims to Boost Your Reception", Re/code, Jan. 13, 2015, [Retreived on Feb. 1, 2015], Retrieved from the Internet: <URL:http://recode.net/2015/01/13/review-an-iphone-case-that-clairns-to-boost-your-reception/?share=reddit&nb=1>.

Irci et al., U.S. Appl. No. 14/635,904, filed Apr. 14, 2015.

\* cited by examiner

REMOVABLE ELECTRONIC DEVICE CASE WITH SUPPLEMENTAL ANTENNA ELEMENT

BACKGROUND

This relates generally to removable cases for electronic devices and, more particularly, to removable cases for wireless electronic devices.

Electronic devices often include wireless circuitry. For example, cellular telephones, computers, and other devices often contain antennas for supporting wireless communications with external equipment. Removable cases are sometimes used with electronic devices. Some cases are passive plastic sleeves that help protect the outer surface of an electronic device from scratches. Other cases contain supplemental batteries. When a case with a supplemental battery is attached to an electronic device, a user can perform more functions without running out of battery power.

It can be challenging to ensure that an electronic device antenna operates properly in the presence of an external case. The materials of the case may affect antenna operation. For example, metal structures associated with a battery of other components may interfere with the normal operation of an electronic device antenna and dielectric materials may load an antenna. If care is not taken, wireless performance for an electronic device may be degraded in the presence of a removable case.

It would therefore be desirable to be able to provide improved removable cases for electronic devices such as electronic devices with antennas.

SUMMARY

A removable case for an electronic device such as a cellular telephone may have a body. The body may be configured to receive the electronic device. A male connector in the case may mate with a female connector in the electronic device. A battery in the case may supply power to the electronic device through a power pin in the male connector. The battery power supplied to the device through the male connector may supplement internal battery power in the electronic device.

The electronic device may have an antenna formed from peripheral conductive electronic device housing structures and an antenna ground. The peripheral conductive housing structures may form an inverted-F antenna resonating element. Due to the presence of external structures such as portions of the case, there is a potential for the antenna of the electronic device to become detuned when the electronic device is received within the body of the case. This risk may be addressed by providing the case with a supplemental antenna. The supplemental antenna may be used to restore antenna performance to the electronic device, so that the electronic device antenna performs satisfactorily, even when the electronic device is received within the body of the case.

The supplemental antenna may be formed from a monopole antenna resonating element having an end that is coupled to the antenna ground through the power pin or other signal path. The monopole element may have a portion that runs parallel to the peripheral conductive electronic device housing structures and that is capacitively coupled to the peripheral conductive electronic device housing structures. During operation of the antenna in the electronic device, the supplemental antenna in the case may be indirectly fed due to near-field coupling between the supplemental antenna and the antenna of the electronic device.

DETAILED DESCRIPTION

Figure 1:
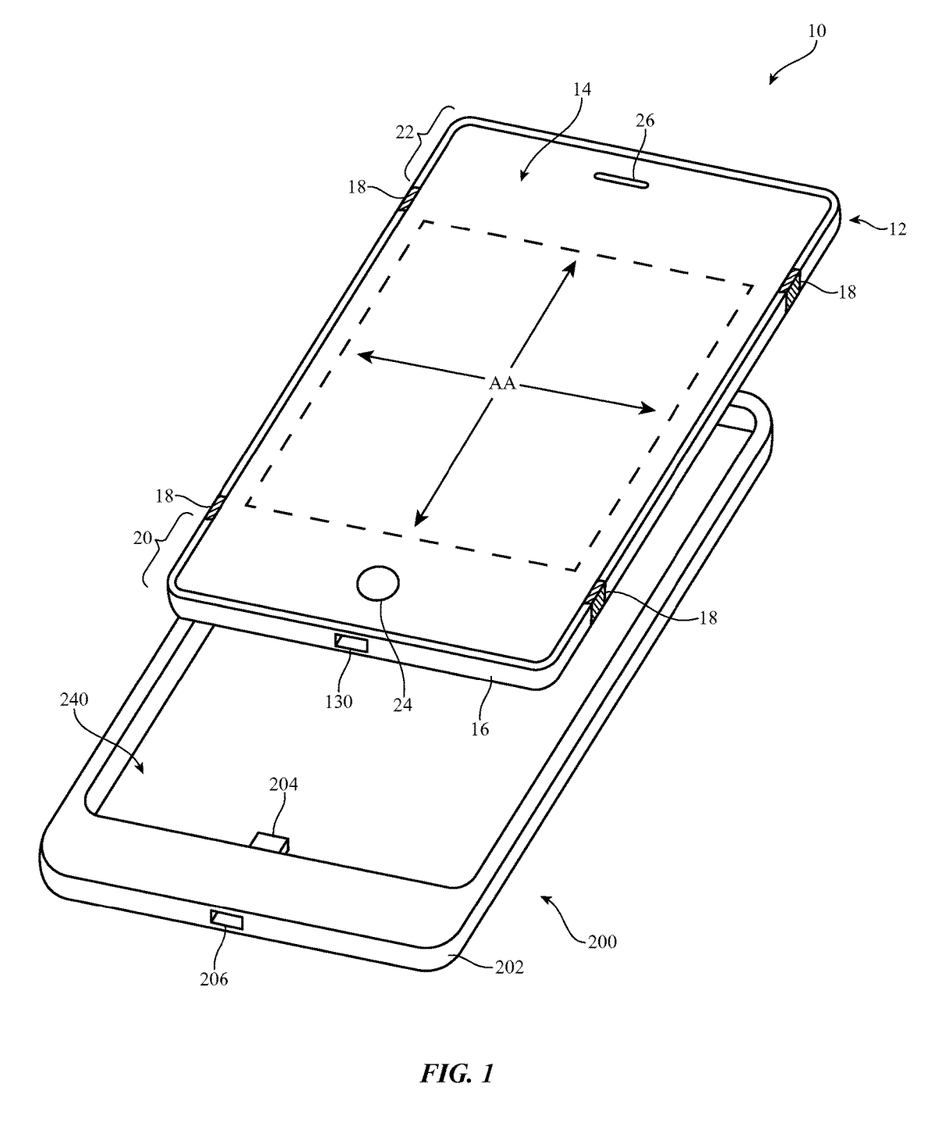
FIG. 1 is a perspective view of an illustrative electronic device and a mating removable case in accordance with an embodiment.

Electronic devices may be provided with removable external cases. The removable external cases may contain supplemental components such as supplemental battery to extend battery life. An illustrative electronic device and a mating removable case are shown in the exploded perspective view of FIG. 1. As shown in FIG. 1, electronic device 10 may have a rectangular shape and case 200 may have a body such as body 202 with a corresponding rectangular recess. Rectangular recess 240 of body 202 may be configured to receive a rectangular device such as electronic device 10 of FIG. 1. Electronic devices and cases of other shapes may be used, if desired. For example, a case may have a folding cover, may have the shape of a sleeve that slides over an electronic device, may mount to only one end of an electronic device, or may have other suitable shape. The example of FIG. 1 is merely illustrative.

Device 10 may include one or more antennas such as loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures and internal structures (e.g., brackets, metal members that are formed using techniques such as stamping, machining, laser cutting, etc.), and other conductive electronic device structures. The housing structures may include peripheral structures such as peripheral conductive structures that run around the periphery of an electronic device. The peripheral conductive structure may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures. Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a laptop computer, a tablet computer, a somewhat smaller device such as a wristwatch device, pendant device, headphone device, earpiece device, or other wearable or miniature device, a handheld device such as a cellular telephone, a media player, an electronic stylus, or other small portable device. Device 10 may also be a television, a set-top box, a desktop computer, a computer monitor into which a computer has been integrated, or other suitable electronic equipment.

Device 10 may include a housing such as housing 12. Housing 12 may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

The rear face of housing 12 may have a planar housing wall. The rear housing wall may be formed from metal with one or more regions that are filled with plastic or other dielectric. Portions of the rear housing wall that are separated by dielectric in this way may be coupled together using conductive structures (e.g., internal conductive structures) and/or may be electrically isolated from each other.

Device 10 may, if desired, have a display such as display 14. Display 14 may be mounted on the opposing front face of device 10 from the rear housing wall. Display 14 may be a touch screen that incorporates capacitive touch electrodes or may be insensitive to touch.

Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A display cover layer such as a layer of clear glass or plastic, a layer of sapphire, a transparent dielectric such as clear ceramic, fused silica, transparent crystalline material, or other materials or combinations of these materials may cover the surface of display 14. Buttons such as button 24 may pass through openings in the cover layer. The cover layer may also have other openings such as an opening for speaker port 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also, if desired, form sidewall structures for device 10 (e.g., by forming a metal band with vertical sidewalls, by curved sidewalls that extend upwards as integral portions of a rear housing wall, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Display 14 may include conductive structures such as an array of capacitive electrodes, conductive lines for addressing pixel elements, driver circuits, etc. Housing 12 may include internal structures such as metal frame members, a planar housing member (sometimes referred to as a midplate) that spans the walls of housing 12 (i.e., a substantially rectangular sheet formed from one or more parts that is welded or otherwise connected between opposing sides of member 16), printed circuit boards, and other internal conductive structures. These conductive structures, which may be used in forming a ground plane in device 10, may be located in the center of housing 12 under active area AA of display 14 (e.g., the portion of display 14 that contains a display module for displaying images).

In regions such as regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air and/or solid dielectrics such as plastic, glass, ceramic, polymers with fiber filler material (e.g., fiber composites), sapphire, etc.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22).

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with gap structures. For example, peripheral housing structures 16 may be provided with one or more peripheral gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two gaps), three peripheral conductive segments (e.g., in an arrangement with three gaps), four peripheral conductive segments (e.g., in an arrangement with four gaps, etc.). The segments of peripheral conductive housing structures 16 that are formed in this way may form parts of antennas in device 10. If desired, gaps may extend across the width of the rear wall of housing 12 and may penetrate through the rear wall of housing 12 to divide the rear wall into different portions. Polymer or other dielectric may fill these housing gaps (grooves).

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Case 200 may have a body such as body 202. Body 202 may be formed from plastic and/or other materials. For example, body 202 of case 200 may be formed from injection molded plastic. Other insulating and/or conductive materials may be used in forming body structures such as body 202 if desired. Rectangular recess 240 may be shaped to receive electronic device 10. If desired, other shapes may be formed in body 202 to receive device 10. The configuration of FIG. 1 is illustrative.

A battery and other components may be mounted within body 202 of case 200. Device 10 may have a connector port with a connector such as female connector 130. Connector 130 may have signal pins and power pins (sometimes referred to as contacts, signal paths, or signal lines). For example, connector 130 may have 5-20 contacts, 16 contacts, 8 contacts, more than 3 contacts, or fewer than 32 contacts. Case 200 may have a mating connector such as male connector 204. When device 10 is mounted in case 200, connector 204 and connector 130 may be coupled to each other (i.e., the contacts of connector 204 may mate with corresponding contacts in connector 130). The battery in case 200 may supply supplemental power to device 10 by routing power signals to the circuitry of device 10 through power pins in connectors 204 and 130.

Connector 204 may be coupled to female connector 206. When it is desired to use an accessory or other external equipment with device 10, an external plug (e.g., a plug on the end of an accessory cable or a plug in a dock) may be inserted into connector 206. Internal wiring in case 200 may route signals from contacts in plug in connector 206 to corresponding contacts in connector 204. Because connector 204 is coupled to connector 130, this routes the signals from the accessory or other external equipment to device 10 (i.e., plugs 204 and 206 serve as a port replicator).

Figure 2:
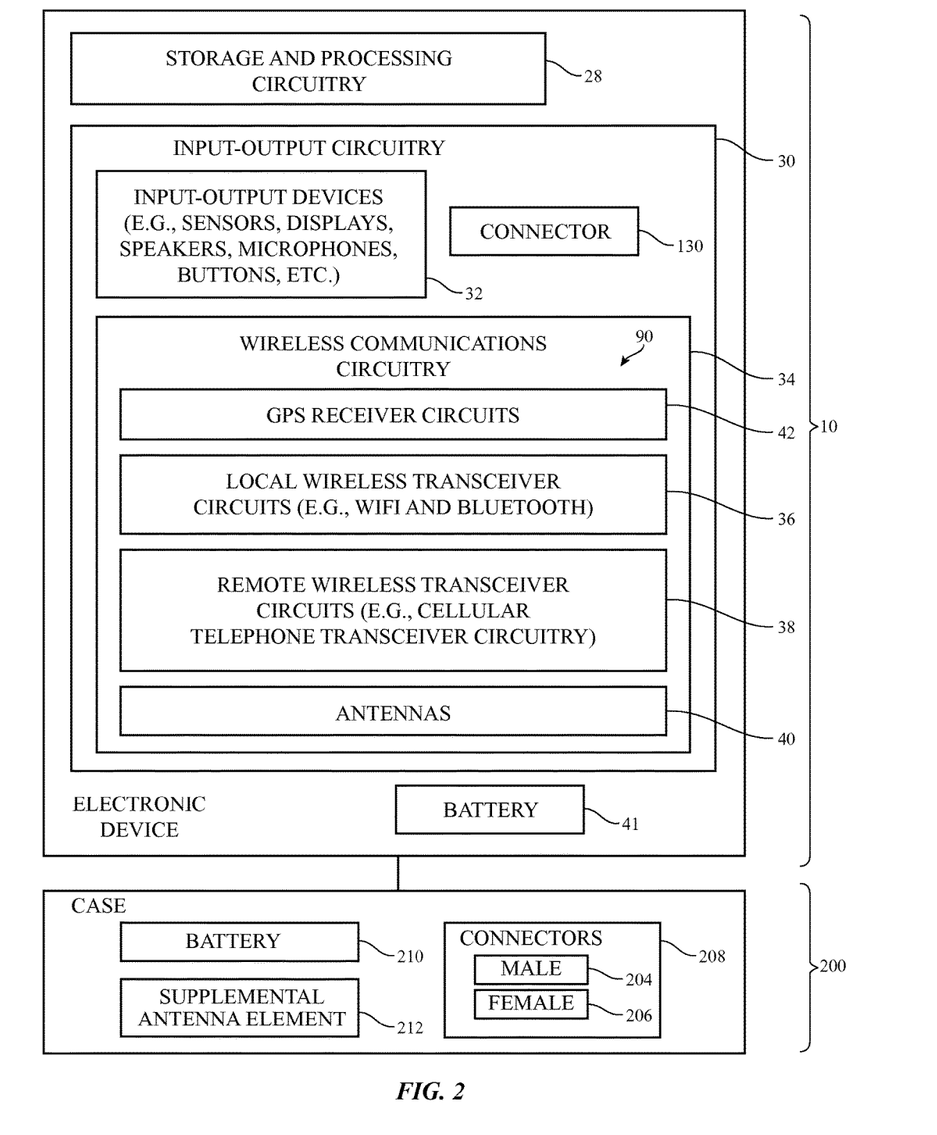
FIG. 2 is a schematic diagram of illustrative circuitry in an electronic device and associated case in accordance with an embodiment.

A schematic diagram showing illustrative components that may be used in device 10 and case 200 of FIG. 1 is shown in FIG. 2. As shown in FIG. 2, device 10 may be powered by an internal power source such as battery 41. External power may also be supplied to device 10 through connector 130. For example, power may be received from battery 210 in case 200 when device 10 has been mounted in case 200 so that connector 204 mates with connector 130.

Device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, fingerprint sensors (e.g., a fingerprint sensor integrated with a button such as button 24 of FIG. 1), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas such as antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Case 200 may have a supplemental antenna structure such as supplemental antenna element 212. Element 212 may help ensure that device 10 operates properly, even in the presence of the structures of case 200. Connectors 208 in case 200 may include male connector 204 and female connector 206. Male connector 204 may be coupled with female connector 130 in device 10 when device 10 is mounted within case 200. Female connector 206 may be configured to receive a plug from external equipment.

Figure 3:
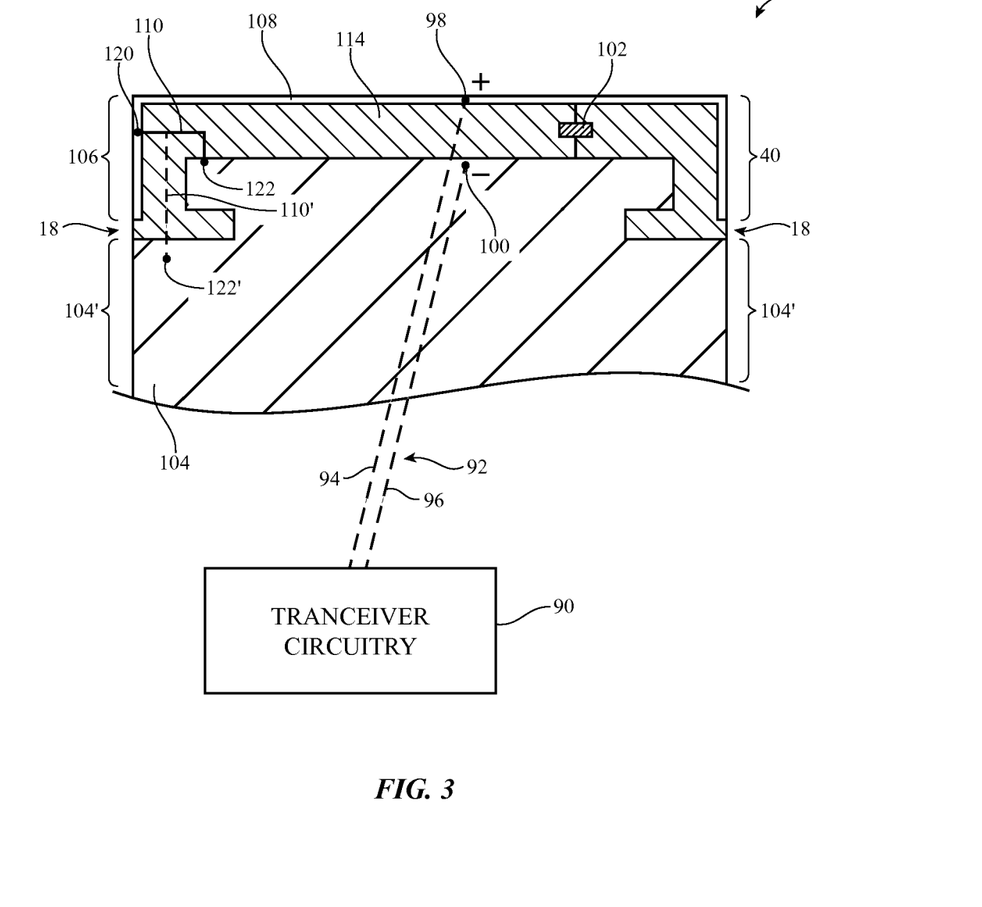
FIG. 3 is a top interior view of a portion of an electronic device having an antenna and a portion of an associated case having a supplemental antenna in accordance with an embodiment.

An interior top view of an illustrative antenna of the type that may be formed in device 10 is shown in FIG. 3. Antenna 40 of FIG. 3 may be formed at end 20, end 22, or other portion of device 10. The configuration for antenna 40 of FIG. 3 is based on an inverted-F antenna design with a slot resonating element (i.e., antenna 40 of FIG. 3 is a hybrid inverted-F slot antenna). This is merely illustrative. Antenna 40 may be any suitable type of antenna.

As shown in FIG. 3, antenna 40 may be coupled to transceiver circuitry 90, so that transceiver circuitry 90 may transmit antenna signals through antenna 40 and may receive antenna signals through antenna 40.

Transceiver circuitry 90 may be coupled to antenna 40 using paths such as transmission line path 92. Transmission line 92 may include positive signal line (path) 94 and ground signal line (path) 96. Transmission line 92 may be coupled to an antenna feed for antenna 40 that is formed from positive antenna feed terminal 98 and ground antenna feed terminal 100. Positive signal line 94 may be coupled to positive antenna feed terminal 98 and ground signal line 96 may be coupled to ground antenna feed terminal 100. If desired, impedance matching circuitry, switching circuitry, filter circuitry, and other circuits may be interposed in the path between transceiver circuitry 90 and antenna 40.

Antenna 40 of FIG. 3 includes inverted-F antenna resonating element 106 and antenna ground 104. Ground 104 may be formed from metal portions of housing 12 (e.g., portions of the rear wall of housing 12, a housing midplate, etc.), conductive structures such as display components and other electrical components, ground traces in printed circuits, etc. For example, ground 104 may include portions such as portions 104' that are formed from metal housing walls, a metal band or bezel, or other peripheral conductive housing structures.

Antenna resonating element 106 may be formed from conductive structure 108. Structure 108 may be formed from peripheral conductive housing structure in device 10 (e.g., a segment of structures 16 of FIG. 1) or other conductive structure. Structure 108 may form a main resonating element arm for inverted-F antenna resonating element 106 and may have left and right ends that are separate from ground structure 104' by peripheral gaps 18.

Conductive structure 108 may have long and short branches (to the opposing sides of the antenna feed in the orientation of FIG. 3) that support respective lower and higher frequency antenna resonances (e.g., low band and mid-band resonances). Inverted-F antennas that have opposing branches such as these may sometimes be referred to as T antennas or multi-branch inverted-F antennas.

Dielectric 114 may form a gap that separates structure 108 from ground 104. The shape of the dielectric gap associated with dielectric 114 may form a slot antenna resonating element (i.e., the conductive structures surrounding dielectric 114 may form a slot antenna). The slot antenna resonating element may support an antenna resonance at higher frequencies (e.g., a high band resonance). Higher frequency antenna performance may also be supported by harmonics of the lower-frequency resonances associated with the longer and shorter branches of structure 108.

One or more electrical components such as component 102 may span dielectric gap 114. Components 102 may include resistors, capacitors, inductors, switches and other structures to provide tuning capabilities, etc. Components 102 may be used to tune the performance of antenna 40 dynamically during antenna operation and/or may include fixed components.

Antenna 40 may have a return path (sometimes referred to as a short circuit path or short pin) such as return path 110. Return path 110 may be coupled between the main inverted-F resonating element arm formed from structure 108 and antenna ground 104 in parallel with the antenna feed formed by feed terminals 98 and 100. Return path 110 may be formed from a metal member having opposing first and second ends. In the example of FIG. 3, return path 110 is formed from a metal structure that has a first end with a terminal 120 coupled to structure 108 of inverted-F antenna resonating element 106 (e.g., on a housing sidewall or other peripheral conductive structure) and has a second end with a terminal 122 coupled to antenna ground 104. Return path 110 may have other shapes and sizes, as illustrated, for example, by dashed line 110' and illustrative terminal 122'.

The presence of case 200 may affect the operation of the structures associated with antenna 40. Accordingly, case 200 may be provided with a supplemental antenna element. The supplemental element may help ensure that antenna 40 operates satisfactorily, regardless of whether or not device 10 is mounted within case 200.

Figure 4:
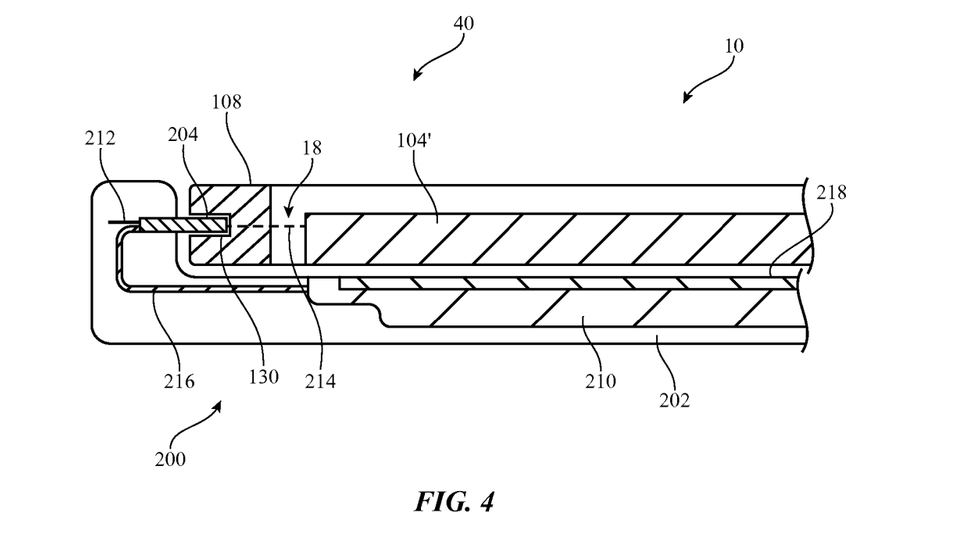
FIG. 4 is a cross-sectional side view of an illustrative electronic device to which a case with a supplemental antenna has been attached in accordance with an embodiment.

A cross-sectional side view of device 10 mounted in case 200 in an illustrative configuration in which case 200 has been provided with a battery and a supplemental antenna element is shown in FIG. 4. As shown in FIG. 4, case 200 includes plastic enclosure (body) 202. Battery 210 and support structures such as metal plate 218 may be mounted within body 202. Flexible printed circuit cable 216 may have a first end that is coupled to the terminals of battery 210 and an opposing second end that is coupled to the power pins of connector 204. When connector 204 is coupled to connector 130 of device 10, power from battery 210 is routed to the circuitry of device 10 via connectors 204 and 130. The signal paths that route power from battery 210 to device 10 may include ground signal path (ground power pin) 214.

The presence of case 200 in the vicinity of device 10 can affect the operation of antenna 40 of device 10. For example, the capacitance of gap 18 (and therefore the capacitance(s) at the tip(s) of the inverted-F antenna resonating elements formed from peripheral conductive housing structures 108) may be affected by the presence of overlapping metal structures such as the metal traces in flexible printed circuit 216. Connector 204 may overlap gap 114 (FIG. 3), which may also affect antenna performance. The dielectric material of body 202 of case 200 can load antenna 40 and may serve to detune antenna when device 10 is mounted in case 200.

To counteract these influences, case 200 may be provided with a supplemental antenna element such as antenna resonating element 212. Antenna element 212 may be, for example, a monopole antenna element that is mounted in body 202. During operation of device 10, antenna element 212 may form a supplemental monopole antenna that helps extend the performance of antenna 40, so that device 10 can handle wireless signals with desired levels of antenna efficiency.

Figure 5:
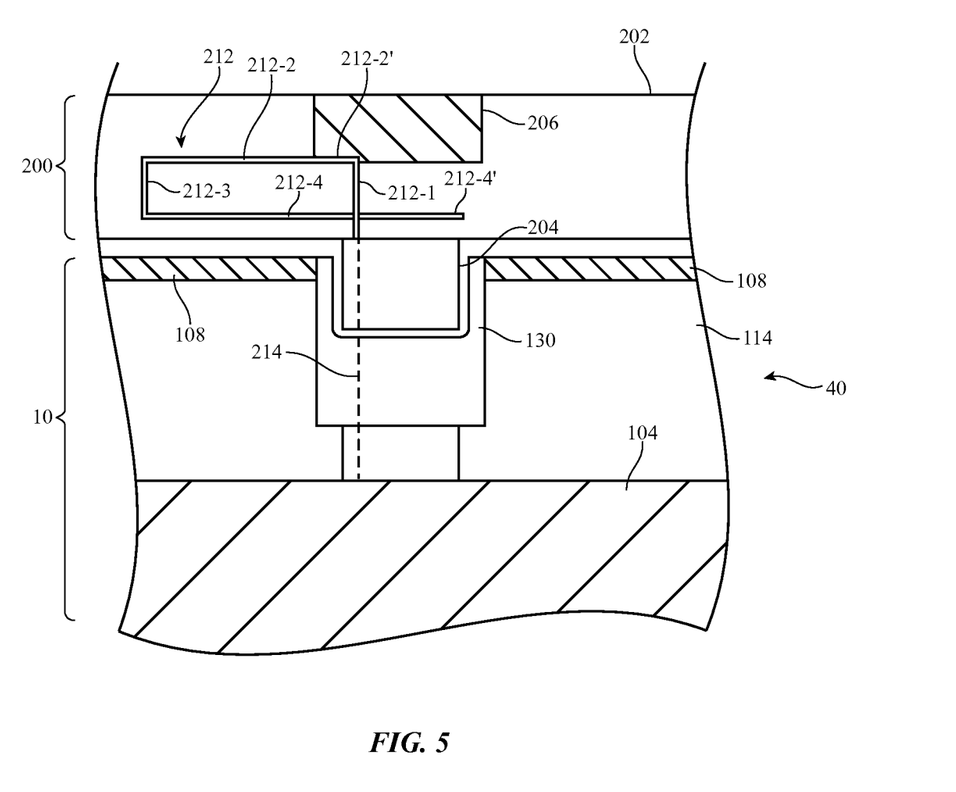
FIG. 5 is a top view of a portion of the illustrative electronic device and case of FIG. 4 in accordance with an embodiment.

FIG. 5 is a top view of portions of device 10 and case 200 in the vicinity of antenna 30. As shown in FIG. 5, when device 10 is mounted in case 200, connector 204 of case 200 may overlap gap 114 between inverted-F antenna resonating element arm 108 and ground 104. This can influence antenna operation. A ground path such as ground path 214 (e.g., a power pin) may couple ground 104 to a supplemental antenna element such as monopole antenna resonating element 212 or other antenna resonating element structure. Supplemental antenna resonating element 212 may be mounted in body 202 of case 200 and may be coupled to ground 104 via ground path 214. Element 212 may be formed from machined metal, from stamped metal parts, may be formed for metal traces on a printed circuit, may be formed from metal traces on a plastic carrier (e.g., metal traces patterned using laser-activated surfaces that have been plated with metal), may be formed from strips of metal or wires, or may be formed from other metal antenna structures.

In the example of FIG. 5, supplemental antenna resonating element 212 has conductive segments such as segments 212-1, 212-2, 212-3, and 212-4 (e.g., metal strips or other metal structures). End portion 212-4' of segment 212-4 may pass under segment 212-1 of element 212 (i.e., element 212 may wrap under itself). Portion 212-2' of element 212 may be coupled to ground structures in connector 216 (if desired). The length of monopole element 212 (i.e., the distance between end portion 212-4' of element 212 and ground) may be configured to provide a supplemental antenna resonance at a desired frequency (e.g., a low band frequency) for device 10.

Segment 214-4 may be adjacent to peripheral conductive housing structure 108 (e.g., an inverted-F antenna resonating element arm in antenna 40). For example, portion 214-4 of monopole element 212 may run parallel to structure 108 and may be capacitively coupled to structure 108. Antenna 40 may be directly fed using an antenna feed formed from positive antenna feed terminal 98 and ground antenna feed terminal 100 of FIG. 3. Due to the capacitive coupling between portion 212-4 of antenna element 212 and portion 108 of antenna 40, antenna element 212 will be near-field coupled to antenna 40. As a result, antenna element 212 (i.e., the supplemental monopole antenna of case 200) will be indirectly fed by antenna 40 during operation of antenna 40. Because antenna 212 is indirectly fed from the near-field electromagnetic coupling between antennas 40 and 212, antenna 212 will resonate and will contribute to the overall performance of antenna 40. Antenna 212 therefore serves as a supplemental antenna structure that helps ensure that antenna 40 operates satisfactorily, even in the presence of the potentially adverse influences of body 212, flexible printed circuit cable 216, connector 204, and other structures in case 200.

Figure 6:
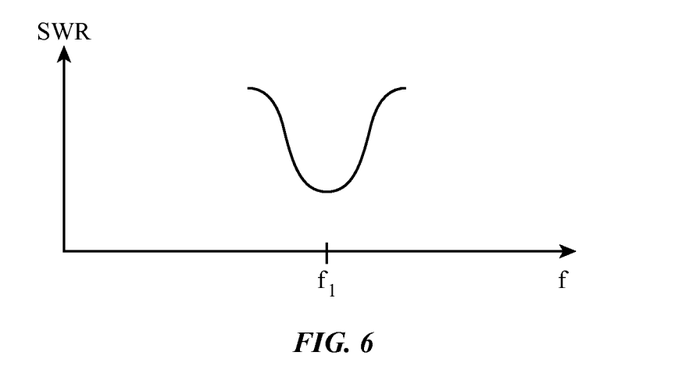
FIG. 6 is graph in which antenna performance (standing wave ratio SWR) has been plotted as a function of operating frequency for an electronic device during normal operation of the device without a mating case in accordance with an embodiment.
Figure 7:
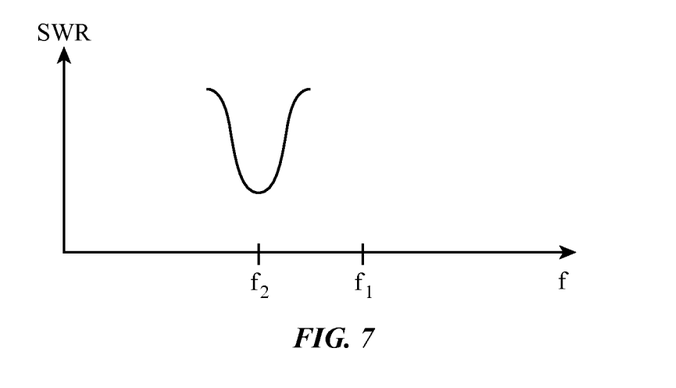
FIG. 7 is a graph of antenna performance for the electronic device antenna of FIG. 6 when the electronic device has been mounted in a case without a supplemental antenna in accordance with an embodiment.
Figure 8:
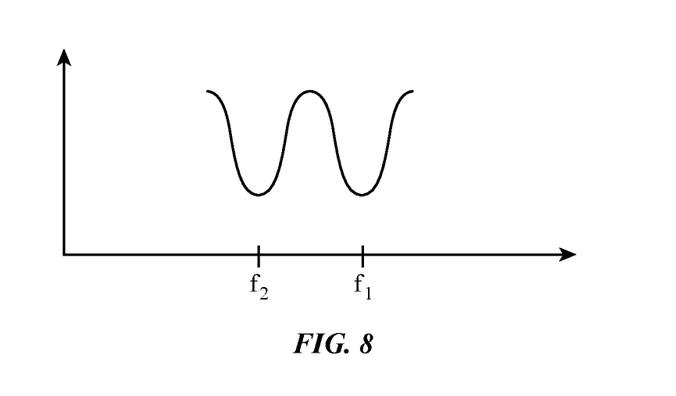
FIG. 8 is a graph of antenna performance for the electronic device antenna of FIG. 7 when the electronic device has been mounted in a case with a supplemental antenna in accordance with an embodiment.

The influence of case 200 and supplemental antenna element 212 on the antenna operation of antenna 40 in device 10 may be understood with reference to the graphs of FIGS. 6, 7, and 8. FIG. 6 shows the performance of antenna 40 in the absence of case 200. In this situation, antenna 40 exhibits a desired antenna resonance at frequency f1. Frequency f1 may be centered within a low band such as a communications band at 700-960 MHz or other suitable frequency range desired for the operation of antenna 40.

FIG. 7 shows how antenna 40 can be detuned due to the presence of the structures of case 200 in the absence of supplemental antenna element 212. As shown in FIG. 7, the antenna resonance for antenna 40 may be detuned (e.g., by moving to a lower frequency f2). This may reduce the performance of antenna 40 at the desired operating band at frequency f1.

FIG. 8 shows the performance of antenna 40 in the presence of case 200 in a scenario in which case 200 incorporates supplemental antenna element 212 of FIGS. 4 and 5. As shown in FIG. 8, the performance of antenna 40 in the communications band at f1 may be restored by the presence of supplemental antenna element 212. There are two frequency peaks in the antenna performance graph of FIG. 8. The lower peak at f2 corresponds to the original detuned performance of antenna 40 (detuned from f1 to f2 due to the presence of the structures of case 200 other than element 212). The higher peak at f1 is a resonance produced by indirectly fed monopole antenna element 212. The peak at f1 that is due to the presence of supplemental element 212 provides device 10 with satisfactory performance at the communications band centered about frequency f1, even though other structures in case 200 are adjacent to device 10.

In general, any suitable antenna structures may be used to serve as a supplemental antenna structure for antenna 40 (e.g., patch antenna structures, loop antenna structures, dipole structures, monopole structures, directly feed structures, indirectly fed structures, inverted-F structures, planar inverted-F structures, strip-shaped elements, elements that include filters or other electrical components, etc. The configuration of FIGS. 4 and 5 in which the supplemental antenna structure is formed from an indirectly fed monopole element is merely illustrative.

The foregoing is merely illustrative and various modifications can be made by those skilled in the art without departing from the scope and spirit of the described embodiments. The foregoing embodiments may be implemented individually or in any combination.

What is claimed is:

1. A removable electronic device case that is configured to mate with an electronic device that has an antenna and a connector port, comprising:
   a body that is configured to receive the electronic device;
   a connector that mates with the connector port; and
   a supplemental antenna element that is configured to be near-field coupled to the antenna, wherein the supplemental antenna element has a first segment that is electrically connected to the connector and a second segment that runs parallel to a portion of the antenna, the second segment is configured to be capacitively coupled to the antenna, and the second segment passes under the first segment.

2. The removable electronic device case defined in claim 1 further comprising a battery that supplies supplemental power to the electronic device when the connector mates with the connector port.

3. The removable electronic device case defined in claim 2 wherein the supplemental antenna element comprises a monopole antenna element.

4. The removable electronic device case defined in claim 3 wherein the antenna resonates in a communications band at a first frequency in the absence of the body, the antenna resonates in a communications band at a second frequency that is lower than the first frequency when the body is adjacent to the electronic device in the absence of the supplemental antenna element, and the supplemental antenna element in the case resonates in the communications band at the first frequency when the body and the supplemental antenna element are adjacent to the electronic device.

5. The removable electronic device case defined in claim 3 wherein the monopole antenna element is configured to be coupled to an antenna ground in the electronic device by a ground pin path in the connector.

6. The removable electronic device case defined in claim 5 further comprising a female connector, wherein a portion of the monopole antenna element is configured to be coupled to the female connector.

7. The removable electronic device case defined in claim 1 wherein the body is formed at least partly from plastic and has a rectangular recess that is configured to receive the electronic device.

8. The removable electronic device case defined in claim 1 wherein the supplemental antenna element is configured to be capacitively coupled to a peripheral conductive housing structure that forms part of the antenna in the electronic device.

9. Apparatus, comprising:
   a body formed at least partly from plastic;
   a battery mounted in the body;
   a male connector;
   a female connector coupled to the male connector;
   a signal path coupled between the battery and the male connector; and
   a monopole antenna resonating element within the body and having first and second opposing ends, wherein the first end is coupled to a pin in the male connector and a portion of the monopole antenna resonating element is interposed between the male and female connectors.

10. The apparatus defined in claim 9 wherein the body is configured to receive a mating electronic device that has an antenna formed from peripheral conductive electronic device housing structures and the signal path overlaps a gap in the peripheral conductive electronic device housing structures when the body receives the mating electronic device.

11. The apparatus defined in claim 10 wherein the antenna of the mating electronic device has an antenna ground and wherein the pin in the male connector is coupled to the antenna ground when the body receives the mating electronic device.

12. The apparatus defined in claim 11 wherein the signal path comprises a flexible printed circuit with metal traces.

13. The apparatus defined in claim 12 wherein the monopole antenna resonating element is formed from a strip of metal that runs parallel to the peripheral conductive electronic device housing structures when the body receives the mating electronic device.

14. A removable case configured to mate with a cellular telephone having an antenna formed from peripheral conductive electronic device housing structures and an antenna ground, the case comprising:
   a connector that mates with a connector port on the cellular telephone, wherein the connector has a plurality of pins that includes a grounding power pin that is electrically coupled to the antenna ground when the removable case mates with the cellular telephone;
   a body that receives the cellular telephone; and
   a supplemental antenna in the body that is configured to be near-field coupled to the antenna in the cellular telephone and that enhances radio-frequency performance by the antenna when the cellular telephone is received by the body, wherein the supplemental antenna has only a single connection to the plurality of pins in the connector, the single connection to the plurality of pins being to the grounding power pin.

15. The removable case defined in claim 14 wherein the cellular telephone has a female connector and the removable case further comprises a male connector that mates with the female connector.

16. The removable case defined in claim 15 further comprising a battery that supplies power to the male connector.

17. The removable case defined in claim 16 wherein the supplemental antenna comprises an antenna element having a portion that runs parallel to the peripheral conductive electronic device housing structures when the cellular telephone is received by the body.

18. The removable case defined in claim 17 wherein the supplemental antenna comprises a monopole resonating element.

19. The removable case defined in claim 15, further comprising a male connector that mates with the connector port on the cellular telephone when the removable case mates with the cellular telephone and further comprising a female connector, a portion of the supplemental antenna being interposed between the male and female connectors.

* * * * *